W. S. PFEIFER

March 17, 1931. STARTING DEVICE FOR SYNCHRONOUS MOTORS Re. 18,000

Original Filed Dec. 14, 1923 2 Sheets-Sheet 1

Inventor,
Walter S. Pfeifer
By Ira M. Jones
Attorney.

W. S. PFEIFER

March 17, 1931. STARTING DEVICE FOR SYNCHRONOUS MOTORS Re. 18,000

Original Filed Dec. 14, 1923 2 Sheets-Sheet 2

Inventor
Walter S. Pfeifer
By Chas. Miller Jones
Attorney

Reissued Mar. 17, 1931

Re. 18,000

UNITED STATES PATENT OFFICE

WALTER S. PFEIFER, OF SHOREWOOD, WISCONSIN, ASSIGNOR, BY MESNE ASSIGNMENTS, TO THE RELIANCE COMPANY, OF WILMINGTON, DELAWARE, A CORPORATION OF DELAWARE

STARTING DEVICE FOR SYNCHRONOUS MOTORS

Original No. 1,782,906, dated November 25, 1930, Serial No. 680,642, filed December 14, 1923. Application for reissue filed January 23, 1931. Serial No. 510,835.

This invention relates to new and useful improvements in starting devices for synchronous motors.

Synchronous motors have been generally endorsed by experts and recommended by the public utilities due to the greater amount of power which is obtained in ratio to the current consumed when compared to the motors of the squirrel cage type. This desirable feature has, however, been offset in the past by the difficulties experienced in the starting of the motor. In the past this has been accomplished by an operator manually closing the various circuits at intervals, often resulting in improper starting and necessitating repeating of the starting operation, as it is essential that each step in the starting cycle be made in its proper sequence with the proper time interval between it and the preceding step. As a result of the obstacles and difficulties experienced in the manual starting of synchronous motors, they have not been generally adopted, and have been viewed with considerable disfavor.

With the above and other objections in mind, this invention has for one of its objects to provide a starting device for synchronous motors wherein the human element is absolutely eliminated and all the operations of the starting cycle performed automatically after an initial starting switch has been closed.

Another object of this invention resides in the provision of a starting device for synchronous motors wherein a prolonged excessive overload or the failure of any of the steps in the cycle renders the entire device inoperative.

While in the starting of a synchronous motor only alternating current is used up to the time the motor is brought to speed, it is advisable to have both the alternating and direct currents at the board when the initial step of the starting cycle is performed to eliminate the possibility of bringing the motor up to speed and not being able to complete the cycle due to the direct current not being on the board when it is to be connected with the rotor.

It is, therefore, another object of this invention to provide a starting device of the character described wherein it is impossible to start the starting cycle unless both alternating and direct current are at the board.

Another object of this invention resides in the provision of means operable upon the failure of any one step in the starting cycle to be completed in its sequence and within a predetermined time interval, whereby the entire starting operation is rendered inoperative.

A further object of this invention resides in the provision of means for producing a time lag between the actuating of the governing relay and the closing of the direct current main switch for connecting the direct current with the rotor after the motor has been brought to speed whereby the governing relay may be set at a sufficiently high value to at all times insure the direct current going on.

And a still further object of this invention resides in the provision of a compound governing relay having a coil of a constant value and a coil of a variable value and responsive to the current consumed by the motor during the period when the same is brought to speed.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which.

Figure 4:
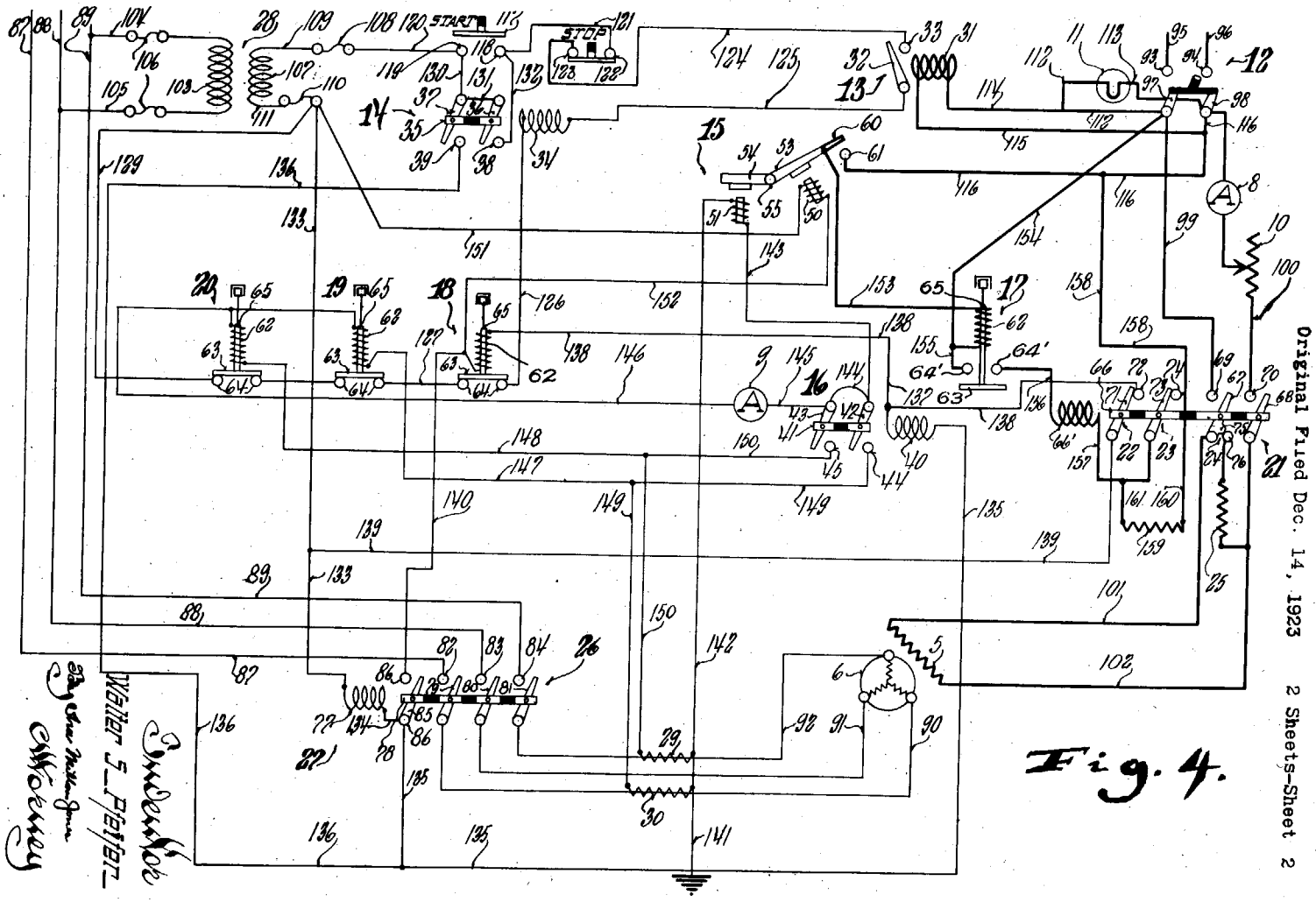
Figure 4 is a diagrammatic showing of the circuits employed.

Referring now more particularly to the drawings in which like numerals designate like parts throughout the several views, the numeral 5 designates the rotor and 6 the stator of a three phase synchronous motor which is diagrammatically illustrated in Figure 4.

Heretofore the starting of a synchronous motor has been chiefly accomplished by the manipulation of various switches, the intervals between the manipulations of which have been controlled by the operator, bringing into play the human element which is objectionable in that the intervals between the closing of the various circuits are varied.

This invention contemplates the elimination of the human element as a factor in the starting operation of a synchronous motor, by providing a single starting switch or button S, which closes an initial circuit to be later described, resulting in the actuation in proper sequence and at the desired intervals of a plurality of actuating devices insuring the proper protection against overload and failure of any of the devices to operate at the proper time up to the point where the motor is in full operation with the alternating current at the stator and the direct current at the rotor.

This invention, as illustrated, employs a front board or panel 7 and a rear board or panel, not shown, the front board or panel mounting a direct current ammeter 8, an alternating current ammeter 9, a rheostat 10, an indicating light 11, a direct current main line switch 12, a start button S, a stop button S′, an initial control, direct current, magnetic switch 13, an alternating current, relay switch 14, a compound governing relay switch 15, an alternating current, relay switch 16, a direct current actuated, timing relay 17, an alternating current protective, timing relay 18 and two overload relays 19 and 20. The rear panel has mounted thereon a direct current magnetic switch 21 which controls auxiliary switches 22 and 23, a resistance cutout switch 24, a resistance 25, an alternating current, main line switch 26 controlling an auxiliary switch 27, a step-down voltage transformer 28 and current transformers 29 and 30.

The magnetic switch 13 is of conventional design embodying a magnetic coil 31, a pivoting armature 32 adapted to, upon attraction toward the coil by its energization, engages a movable contact carried by the armature with a fixed contact 33. The magnetic switch 14 is also of conventional construction including a magnetic coil 34 and a movable armature 35 adapted to be attracted thereto upon energization and carrying a pair of movable contacts 36 and 37 which are engageable with fixed contacts 38 and 39, respectively. The magnetic switch 16 is similar in construction to the magnetic switch 14 and comprises a magnetic coil 40, a movable armature 41 controlling a pair of movable contacts 42 and 43 which are engageable with a pair of fixed contacts 44 and 45, respectively.

The compound governing relay switch 15 is of special construction and includes two substantially U-shaped longitudinally aligned core or pole members 46 and 47 around the opposite ends 48 and 49 of which are wound magnetic coils 50 and 51 respectively. Positioned medially of the cores or pole members 46 and 47 is a pivot standard 52 to which the armatures 53 and 54 for the coils 50 and 51 respectively, are pivotally secured by a pivot 55.

Figure 3:
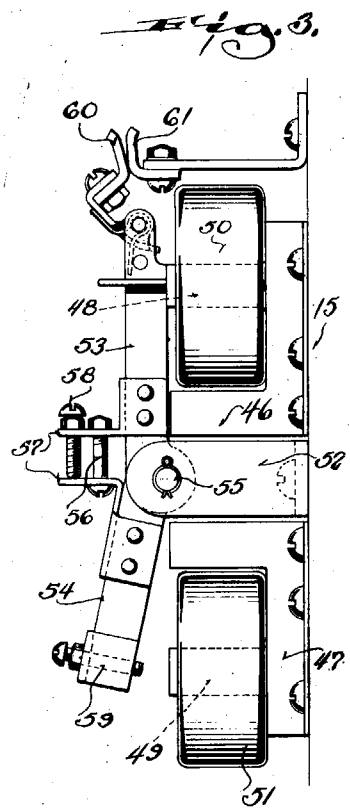
Figure 3 is a side view thereof.
Figure 2:
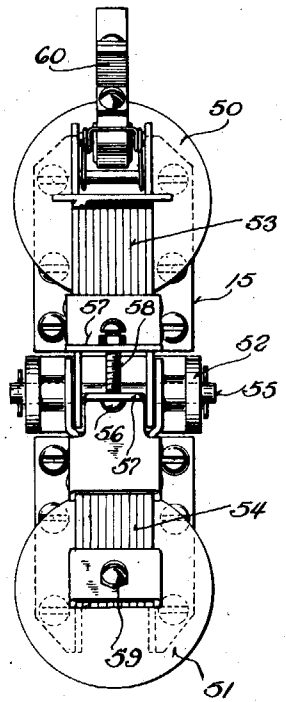
Figure 2 is a front elevation of a compound governing relay employed in connection with my improved synchronous motor starting device.
Figure 1:
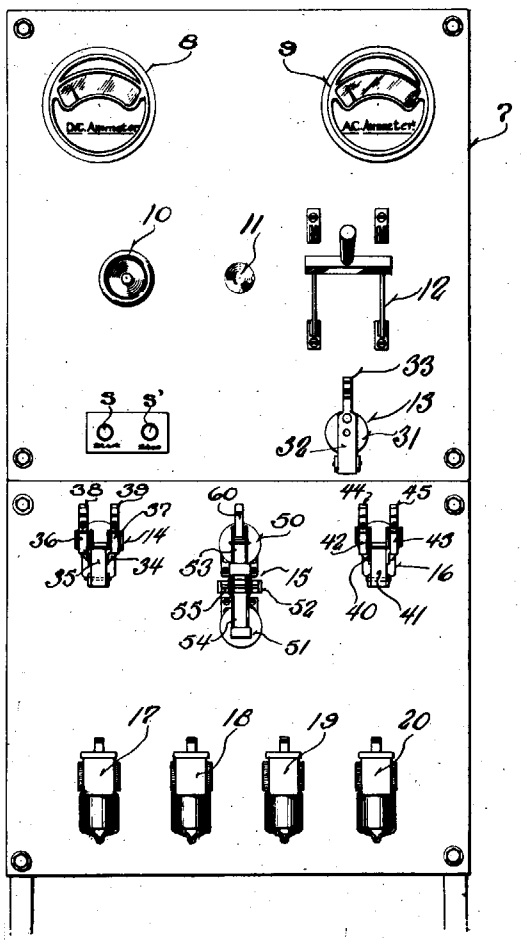
Figure 1 is a view in front elevation of the panel or front switch board of a synchronous motor starting device embodying my invention.

The armatures 53 and 54 are rigidly connected at an angle with respect to each other by a bolt or other fastening member 56 which passes through lateral projections or flanges 57 carried by the armatures, a setting bolt or screw 58 cooperating with the fastening member 56 and permitting a fine adjustment of the angle between the armatures to vary the sensitiveness of the magnetic switch, as will be later described. The movement of the armature 54 toward its magnetic coil may be adjusted by a set screw 59 passing through the end thereof and adapted to butt the core 49, as will be readily apparent. The outer end of the armature 53 carries a movable contact 60 which is adapted to engage a fixed contact 61 when the armatures are in their positions illustrated in Figures 2 and 3.

The relays 17, 18, 19 and 20 are of the construction illustrated in Letters Patent No. 1,449,025 granted Gustav O. Wilms, March 20, 1923, and each includes a relay coil 62, a movable contact 63 adapted to bridge contacts 64, the movable contact being controlled by an armature 65 with one end of which suitable dash pot means, not shown, are connected. Each of the relays 17, 18, 19 and 20 are identical in structure with the exception of relay 17, the contacts 64′ of which are normally open and only close upon operation of the relay.

The direct current magnetic switch 21 embodies a magnetic coil 66′, and an armature 66 adapted to be attracted thereto and carrying a pair of movable contacts 67 and 68 adapted to engage stationary contacts 69 and 70, respectively, when the armature 66 is attracted to the coil 66′ by its energization. The auxiliary switch 22 is controlled from the movable armature 66 to disengage movable contact 71 from the stationary contact 72 when said direct current magnetic switch is closed and to close said auxiliary switch contacts when the direct current magnetic switch is opened. The auxiliary switch 23 is similar in construction to the auxiliary switch 22 and embodies a movable contact 73, which is controlled from the magnetic switch armature 66, and a fixed contact 74. As the operation of this auxiliary switch is identical with that of the auxiliary switch 22, further description thereof is deemed unnecessary. The resistance cut-out switch 24 is of similar design, comprising a movable contact 75 which is in effect the continuation of the movable contact 67 and which is engaged with a fixed contact 76 when the direct current magnetic switch 21 is opened and is disconnected therefrom when the magnetic switch 21 is closed.

The alternating current main line switch 26 includes a magnetic coil 77 and an armature 78 which controls three movable contacts 79, 80 and 81 adapted to be engaged with fixed contacts 82, 83 and 84 when the armature 78 is attracted to the coil 77 by its energization and to be disengaged therefrom when the armature 78 is deenergized. The auxiliary switch 27 is controlled directly from the armature 78 and includes a movable contact 85 which is actuated by the armature 78 to bridge a pair of fixed contacts 86 when the armature 78 is attracted to its coil 77.

The alternating current is led to the fixed contacts 82, 83 and 84 by three service lines 87, 88 and 89, respectively, and the alternating current is connectible with the fields of the stator upon closing of the alternating current main line switch 26 through the conductors 90, 91 and 92 leading from the movable contacts 79, 80 and 81, respectively. The direct current is led to the fixed contacts 93 and 94 of the switch 12 on the main switch board or panel by the service lines 95 and 96, respectively, and the movable contacts 97 and 98 of the switch 12 are connected with the fixed contacts 69 and 70 of the direct current magnetic switch 21 by conductors 99 and 100, respectively, the rheostat 10 and the direct current ammeter 8 being connected in on the conductor 100, as clearly depicted in Figure 4. The direct current is thence connectible with the rotor 5 of the motor when the direct current magnetic switch 21 is closed, through the conductors 101, 102 leading from the movable contacts 67 and 68, respectively, to the rotor.

The voltage in the embodiment illustrated, at the A. C. service line is extremely high and for this reason it is desirable to step down the voltage of the current used at the switch board for controlling the various magnetic switches. To this end the transformer 28 is provided and one end of its primary coil 103 connected with line 89 by a conductor 104 and the other end thereof connected with line 88 by a conductor 105, suitable fuses 106 being provided within the conductors 104 and 105 to provide a factor of safety. The secondary coil 107 of the transformer 28 has one end thereof connected with one end of a fuse 108 mounted on the front switch board by a conductor 109 and has its other end connected with one end of a fuse 110 mounted on the front switch board by a conductor 111, thus bringing the alternating current of low voltage for operation of the alternating current actuating magnetic switches to the front switch board.

With the circuits as illustrated in the drawings, the alternating current is brought to the fuses 108 and 110, and all of the controlling devices are inoperative. Switch 12 is first thrown in, engaging the movable contacts 97 and 98 with the contacts 93 and 94 illuminating the indicating light 11 which is connected across the contacts 97 and 98 by conductors 112 and 113, the direct current being advanced to the contacts 69 and 70 of the magnetic switch 21, and the coil 31 of the switch device 13 being energized by reason of one end thereof being connected with the contact 97 by a conductor 114 connected with the conductor 112 and a conductor 115 which is connected with a conductor 116, connected to the contact 98, engaging the contacts 32 and 33 so that upon the manipulation of the starting button S to engage the movable contact 117 thereof with the fixed contacts 118 and 119 thereof, the coil 34 of the magnetic switch device 14 is energized engaging the contacts 36 and 38, 37 and 39, respectively. The circuit of the coil 34 is then from the fuse 108 through the conductor 120, contact 119, contact 117, contact 118, conductor 121, contact 122, the stop switch and contact 123 thereof, conductor 124, contacts 33 and 32 on the switch device 13, conductor 125, through the coil 34, conductor 126, contacts 64 and 63 of the protecting relay 18 and the overload relays 19 and 20, one contact 64 of the protective timing relay 18 being connected with one contact 64 of the overload relay 19 by a conductor 127, one contact 64 of the overload relay 19 being connected with one contact 64 of the overload relay 20 and thence to the fuse 110 through a conductor 129 connected with the other contact 64 of the overload relay 20.

The stop switch is of the normally closed type and the starting switch of the normally open type and a release of the pressure on the button S permits its movement to open position as a result of which the circuit of the coil 34 is then through the conductor 120, contact 119 of the start switch, conductor 130 which is connected with the movable contact 37 of the switch device 14, conductor 131 which leads from the movable contact 37 to the movable contact 36, contacts 36 and 38, conductor 132 connecting the contact 38 with the contact 118 and thus through the stop switch and the remainder of the circuit previously described.

As stated, immediately upon the energization of the coil 34, contacts 36 and 38, and 37 and 39 are made, as a result of which the magnet 77 of the main line alternating current switch 26 is energized, the circuit thereof being closed through a conductor 133 leading from the fuse 110, to one end of the coil 77, through the coil, a conductor 134 connecting the other end of the coil with one contact 86 of the auxiliary switch 27 through a conductor 135 leading from the contact 86, through a conductor 136 leading from the conductor 135 to the contact 39, contact 37, thence to the fuse 108 through the conductor 130, contact 119 and conductor 120, closing the switch 26 to engage its contacts 79 and 82, 80 and 83 and 81 and 84, and connecting the stator 6 of the motor with the A. C. line, the circuits being through conductor 87, contacts 82 and 79 and conductor 90 to the stator, conductor 88, contacts 83 and 80 and through conductor 91 to the stator, conductor 89, contacts 84 and 81 and to the stator, through conductor 92, as a result of which the motor is started. The magnetic switch device 16 is actuated simultaneously with the main line switch device 26, if not slightly prior thereto due to its being of a lighter type and having less inertia to overcome, the circuit of the coil 40 thereof being through conductor 120, contact 119, conductor 130, contacts 37 and 39, conductor 136, conductor 135, through the coil 40, conductor 137, conductor 138, through contacts 72 and 71 of the auxiliary switch 22, conductor 139 and thence to the fuse 110 through the conductor 133, closing the contacts 42 and 44, 43 and 45.

As the contacts 86 are bridged by the movable contact 85, the circuit of the protective timing relay 18 is closed through conductor 120, contact 119, conductor 130, contacts 37 and 39, conductor 136, conductor 135, the auxiliary switch 27, conductor 140, through the coil 62 of the relay 18, through conductor 138, auxiliary switch 22, of the direct current magnetic switch, conductor 139, thence to the fuse 110 through conductor 133. The current transformers 29 and 30 are connected by a common conductor 141 with the ground G and to a conductor 142 which leads to one end of the coil 51 of the governing relay device 15, the other end of the coil being connected with the movable contact 42 of the control device 16 by a conductor 143, the contacts 42 and 43 being connected by a common conductor 144 and with one side of an alternating ammeter 9 by a conductor 145, the other side of the ammeter being connected by a conductor 146 with the coils 62 of the overload relays 19 and 20, the other side of the overload relay 19 being connected with the stationary contact 44 of the device 16 by a conductor 147 and the other side of the coil 62 of the overload relay 20 being connected with the stationary contact 45 by a conductor 148. The contacts 44 and 45 are connected with the other sides of the transformers 30 and 29 by conductors 149 and 150 respectively. The overload relays 19 and 20 and the A. C. ammeter 9 are thus short circuited and rendered inoperative while the coil 40 of the magnetic switch 16 is energized.

The coil 51 of the device 15 is thus energized and the value of the current flowing therethrough is in proportion to the value of the current taken by the starting action of the motor which is very high at the initial start and decreases as the motor speed increases. The coil 50 of the device 15 is also energized its circuit being from the fuse 110 through the conductor 151, through the coil 50, through conductor 152, through conductor 140, through the auxiliary switch 27, conductor 135, conductor 136, contacts 39 and 37, conductor 130, contact 119 and to the fuse 108, through conductor 120. The value of the current supplied the coil 50 is constant and as the strength of the coil 51 is extremely high during the starting of the motor as previously described, the armature 54 will be attracted to the coil 51 against the pull exerted on the armature 53 by the pull of the coil 50 and as the motor comes to speed and the strength of the coil 51 falls, armature 53 will then be pulled in closing the contacts 60 and 61 closing the circuit of the coil 62 of the timing relay, which is operated by direct current through the conductor 116, contacts 61 and 60, conductor 153, through the coil 62 of relay 17 and back to the other side of the line through a conductor 154 connected with the switch contact 97.

After the interval of several seconds, according to the adjustment of the timing relay 17, contact 63 is engaged with the contacts 64′ bridging the same, as a result of which coil 66′ of the direct current magnetic switch 21 is energized, closing the direct current to the rotor through the contacts 69 and 67, conductor 101 and through the contacts 70 and 68 and conductor 102, at the same time opening the contacts 75 and 76 of the auxiliary switch 24, opening the resistance 25 which has been in the rotor line to prevent the building in the rotor of a high voltage and also breaking the contacts 71 and 72 of the auxiliary switch 22 and contacts 73 and 74 of the auxiliary switch 23.

The circuit of the coil 66′ when energized is through the switch contact 97, conductor 154, conductor 155, contacts 63, and 64′, conductor 156, through the coil 66′ through the conductor 157, through the auxiliary switch 23, conductor 158 to the other contact 98 through the conductor 116. The opening of the auxiliary switch 23 does not break the continuity of the circuit of the coil 66′ but merely throws into the circuit a resistance 159, one end of which is connected with the conductor 158 by a conductor 160 and the other end of which is connected with the conductor 157 by a conductor 161.

The opening of the auxiliary switch 22 breaks the continuity of the magnetic coil 40 as a result of which the overload relays 19 and 20 are thrown into the line as well as the alternating current ammeter 9 and the motor is then running at full speed under normal conditions. The opening of the auxiliary switch 22 also cuts out the protective timing relay 18, one side of which is connected with conductor 138, as previously described.

While the drawings and the above description refer to an arrangement wherein the direct current is obtained from an external source, it will be apparent that this invention may be employed without any change, with a synchronous motor of the self-excited type, i. e., one having means such as a conventional exciter, not shown, for generating and delivering its own direct current to the leads 95 and 96. In this structure the relay switch 13 is eliminated and the relay 34 then directly connected with the contact 123 of the stop switch. It is a well known fact that the voltage of the direct current generated in synchronous motors of the self-excited type is not built up simultaneously with the coming to speed of the motor and for this reason a time lag must be provided between the time the motor comes to speed and the time the direct current is connected with the rotor 5. This time lag is provided by the timing relay 17.

By reason of the angle between the armatures 53 and 54 of the governing relay 15 being adjustable, the response of this relay to the condition in the alternating current line is readily adjustable and the period at which the contacts 60 and 61 close controlled.

The rheostat 10 may be eliminated, if desired, as the same is only incorporated in the direct current line when specified by the customer.

From the foregoing description taken in connection with the accompanying drawings, it will be readily obvious that upon failure of any one of the devices in the starting cycle of the motor the entire starting operation will be thrown out in a predetermined time and it will be necessary to again start at the beginning. Further that it is impossible to complete the initial step in the cycle without having both alternating and direct current at the board.

With this scheme of control is provided a means whereby the overload relays are inserted into the circuit only after the start has been completed which permits a closer setting on the same giving better protection to the motor. At the same time a protective timing relay is built into the control which will disconnect the motor from the line in case the start has not been completed in a predetermined interval. As is understood, this type of control does not give protection during the starting period, which is the period of high current, by current relays, but the control allows certain time for the motor to come to speed and if this is not accomplished the control is brought to the off position.

The starting device illustrated also provides a means through a timing relay 17 whereby a lag is introduced between the operation of governing relay 15 and magnetic switch 21. This time lag has the value in that it allows a setting on the governing relay 15 which assures its operation providing the motor comes to speed, by giving the motor additional time to come near synchronous speed after the governing relay has operated, and in a self excited motor gives the D. C. generator additional time in which to build up its voltage.

What I claim as my invention is:

1. An appliance of the character described, comprising a synchronous electric motive machine having a direct current supply circuit for the field, a plurality of automatic devices adapted to be operated by the direct current, a plurality of automatic devices adapted to be operated by alternating current, a plurality of electrical circuits including the automatic devices and adapted to be closed in sequence at predetermined intervals to effect the starting of the machine, a starting switch adapted to be actuated to close one of the circuits to effect the automatic actuation in sequence of said devices, and means operable upon failure of any of said automatic devices to actuate within a predetermined period of time to render inoperative all of said devices which are in operative position.

2. The combination with a synchronous electro-motive machine adapted to be started by having alternating current applied to the stator thereof and to have direct current applied to the rotor after the motor has approached synchronous speed, of a governing relay controlled from the alternating current supplied the stator at a voltage derived from the stator circuit, a timing relay, a circuit including said timing relay and said governing relay, said governing relay being actuated upon the machine approached synchronous speed to throw in the circuit of said timing relay, and means actuated by said timing relay within a predetermined period of time after the actuation of said governing relay to connect the direct current with the rotor, said timing relay providing a time lag between the time when the machine approached synchronous speed and the direct current is connected with the rotor thereof.

3. The combination with a synchronous motor adapted to be started by having alternating current applied to the stator thereof and to have direct current applied to the rotor of the motor after the motor has approached synchronous speed, of a governing relay controlled from the alternating current supplied the stator of the motor, a timing relay, a circuit including said timing relay and said governing relay, said governing relay being actuated upon the motor approaching synchronous speed to throw in the circuit of said timing relay, means actuated by said timing relay within a predetermined period of time after the actuation of said governing relay to connect direct current with the rotor, said timing relay providing a time lag between the time when the motor approaches synchronous speed and the direct current is connected with the rotor thereof, and means operable to disconnect the alternating current from the stator of the motor upon the failure of direct current to be supplied the rotor within a predetermined period of time.

4. The combination with a synchronous motor adapted to be started by having alternating current applied to the stator thereof and to have direct current applied to the rotor of the motor after the motor has approached synchronous speed, of a main line alternating current magnetic switch adapted to connect the stator of the motor with a source of alternating current, a circuit including said main line magnetic switch, a magnetic relay switch adapted to, upon actuation, close said first mentioned circuit and actuate the main line switch, an overload relay within the circuit of said magnetic relay switch and operable upon the occurrence of an overload to break the continuity of the circuit thereof and disconnect the motor stator from its source of alternating current, and means operable during the entire period the motor is being brought to speed to render said overload relay inoperative.

5. The combination with a synchronous motor adapted to be started by having alternating current applied to the stator thereof and to have direct current applied to the rotor of the motor after the motor has approached synchronous speed, of a main line alternating current magnetic switch adapted to connect the stator of the motor with a source of alternating current, a circuit including said main line magnetic switch, a magnetic relay switch adapted to, upon actuation, close said first mentioned circuit to actuate the main line switch, an overload relay within the circuit of said magnetic relay switch and operable upon the occurrence of an overload to break the continuity of the circuit thereof and disconnect the motor stator from its source of alternating current, means operable during the period the motor is being brought to speed to render said overload relay inoperative, and a protective timing relay adapted to be thrown into the circuit of said magnetic relay device during the period said overload relay is rendered inoperative whereby the continuity of the circuit of said magnetic relay device is broken and the stator disconnected from its source of alternating current upon the failure of the motor to come to speed within a predetermined period of time.

6. The combination with a synchronous motor adapted to be started by having alternating current applied to the stator thereof and to have direct current applied to the rotor of the motor after the motor has approached synchronous speed, of a main line alternating current magnetic switch adapted to connect the stator of the motor with a source of alternating current, a circuit including said main line magnetic switch, a magnetic relay switch adapted to, upon actuation, close said first mentioned circuit to actuate the main line switch, an overload relay within the circuit of said magnetic relay switch and operable upon the occurrence of an overload to break the continuity of the circuit thereof and disconnect the motor stator from its source of alternating current, means operable during the period the motor is being brought to speed to render said overload relay inoperative, a protective timing relay adapted to be thrown into the circuit of said magnetic relay device during the period said overload relay is rendered inoperative whereby the continuity of the circuit of said magnetic relay device is broken and the stator disconnected from its source of alternating current upon the failure of the motor to come to speed within a predetermined period of time, a direct current magnetic switch adapted to, upon being closed, connect the rotor of the motor with a source of direct current, and means operable within a predetermined period of time after the motor has approached synchronous speed for closing said direct current magnetic switch.

7. Automatic starting means for synchronous motors, comprising; a normally open excitation circuit including a supply source a normally open controlling circuit therefor and in parallel therewith; a normally open circuit in parallel with said excitation circuit and with said controlling circuit, and including means for closing said excitation circuit; means in said controlling circuit for closing said last named circuit; a manually closed motor actuating circuit; and means influenced by the current in said motor actuating circuit for closing said controlling circuit and thereby bringing about the closing of said excitation circuit.

8. Automatic starting means for synchronous motors, comprising; a normally open excitation circuit including a supply source; a normally open controlling circuit therefor and in parallel therewith; a normally open intermediate circuit in parallel with said excitation circuit and said controlling circuit, and including means for closing said excitation circuit; means included in said controlling circuit for closing said intermediate circuit; a manually closed motor actuating circuit; means influenced by the current in said motor actuating circuit for closing said controlling circuit; and a normally closed circuit in parallel with said excitation circuit for rendering said manually closed actuating circuit operable.

9. Automatic starting means for synchronous motors, comprising; an excitation circuit open at a plurality of points and including a supply source; a normally open controlling circuit therefor and in parallel therewith; a normally open intermediate circuit in parallel with said excitation circuit and said controlling circuit, and including means for closing said excitation circuit; means in said controlling circuit for closing said intermediate circuit; a motor actuating circuit; manually operable means for effecting the closing of said actuating circuit; means influenced from said motor actuating circuit for closing said controlling circuit; one of the open points of said excitation circuit being manually closable; a shunt circuit including said supply source and closable by the closing of said manually closable point in the excitation circuit, and including means for rendering the operation of said manually closable means for the motor actuating circuit effective only when the shunt circuit is closed.

10. In an automatic starting system for synchronous motors; a motor actuating circuit; manually operable means for effecting the closing thereof; an excitation circuit; a shunt circuit in connection therewith; and means in said shunt circuit for rendering said manually operable means effective only when said shunt circuit is closed.

11. In a starting system for synchronous motors; an excitation circuit including a supply source; a controlling circuit therefor and in parallel therewith; a motor actuating circuit; means influenced from said motor actuating circuit and biased thereby to close said controlling circuit; and means responsive to current consumed by the motor actuating circuit for counteracting the bias of said first named means until the motor approaches synchronous speed.

12. In a starting system for synchronous motors; an excitation circuit manually closable to include a supply source; a controlling circuit therefor and in parallel therewith; a transformer; a motor actuating circuit including the primary of said transformer; a governing circuit including both a secondary of said transformer and means for closing the controlling circuit for said excitation circuit; and means operable only upon closure of said excitation circuit to include the supply source, to effect the closing of said motor actuating circuit.

13. In a starting system for synchronous motors; an excitation circuit including a supply source; a controlling circuit for said excitation circuit and in parallel therewith; a motor actuating circuit including a motor; means influenced by said motor actuating circuit and biased thereby to close said controlling circuit; means responsive to current passing through the motor in said motor actuating circuit for counteracting the bias of said first named means until the motor approaches synchronous speed; and a timing relay in said controlling circuit for closing said excitation circuit.

14. In a starting system for synchronous motors; an excitation circuit including a supply source; a controlling circuit for said excitation circuit and in parallel therewith; a motor actuating circuit; means inductively controlled by a circuit in parallel with said motor actuating circuit and biased to close said controlling circuit; and means inductively responsive to current consumed by the motor actuating circuit, and operative to counteract the bias of said biased means until the motor approaches synchronous speed.

15. Automatic starting means for synchronous motors, comprising; an excitation circuit including a supply source and a plurality of switches; a circuit for controlling said excitation circuit, in parallel therewith and including a switch; an intermediate circuit in parallel with both said excitation circuit and said controlling circuit, and including switch operating means for a switch of said excitation circuit; said intermediate circuit also including a switch operated by timing relay means in said controlling circuit; a motor actuating circuit; a plurality of circuits inductively connected with said motor actuating circuit, one of said inductively connected circuits including means biased to close the controlling circuit for said excitation circuit, and also including means for closing an operating circuit through a motor; another of said inductively connected circuits including means for counteracting the bias of said biased means until the motor approaches synchronous speed; and a shunt circuit connected with said excitation circuit and including means for rendering the operation of all of said circuits and means ineffective until said shunt circuit is closed.

16. In an automatic starting system for synchronous motors; a motor actuating circuit including a switch; a circuit inductively connected with said motor circuit and including means for operating said switch; an excitation circuit; a circuit in parallel connection with said inductive circuit and including means for effecting the closing of said excitation circuit when the motor approaches synchronous speed; a controlling circuit in parallel connection with both of said inductive circuits; and a protective circuit in parallel connection with all of said inductive circuits and including time relay means for opening said controlling circuit after a predetermined time interval; and means operated by the closing of said excitation circuit to open said protective circuit.

17. In a starting system for synchronous motors including alternating and direct current sources, an electro-magnetic motor actuating switch in the alternating current source, a manually operated circuit closer therefor, and direct current means in the motor field supply line operable to control the operative effectiveness of said circuit closer.

18. In a starting system for synchronous motors, electro-responsive switch mechanism for connecting the field of the motor to a direct current supply circuit for running, and means for controlling said switch mechanism including a relay operated responsively to the variation of starting current in the motor, said relay connecting the direct current supply circuit to the motor field when the motor approaches synchronous speed.

19. The combination with a synchronous motor, of a main line switch for controlling said motor, an overload relay for opening said switch when excessive current flows to said motor, a bypass shunt for said overload relay, a switch for controlling the field circuit of said motor, a relay for closing said last-named switch when said motor attains a predetermined speed, and means for opening the circuit of said bypass shunt simultaneously with the closing of said field circuit switch.

20. The combination with a synchronous motor, of an exciter for supplying current to the field of said motor, a switch for controlling the connection between said exciter and field, an overload relay for protecting said motor against excessive currents, a bypass shunt for said overload relay, and means connected with said field circuit switch for opening said bypass shunt simultaneously with the closing of said field circuit switch.

21. The combination with a synchronous motor, of a main line switch for controlling the current to said motor, an overload relay for controlling said main line switch, a current transformer connected with the supply circuit for said motor for operating said overload relay, a bypass shunt for said overload relay, and means for opening said bypass shunt to permit operation of said overload relay independently of said bypass shunt during full speed operation of said motor.

22. The combination with a synchronous motor of a field supply line, automatic means for connecting the motor field and supply line, electro-responsive means arranged for controlling the operation of said automatic connecting means, an actuating circuit for said electro-responsive means, said actuating circuit being capable of completion to normal operating condition only when the motor is in a condition less than at normal speed.

23. In combination, an alternating current motor having a field winding arranged to be connected to a direct current source of supply for synchronous running of the motor, the said motor being arranged to start as an asynchronous motor and to run as a synchronous motor, a governing relay adapted to effect energization of the motor field winding when the motor approaches its synchronous speed and a time interval device to be set in operation in response to the governing relay to complete the connection of said field winding to said direct current source, the said device being provided with means controlled by the motor for regulating the timing thereof to effect said connection when the motor accelerates normally to substantially synchronous speed.

24. In a starting system for synchronous motors, an electro-magnetic motor actuating switch, a manually operated circuit closer therefor, said switch and circuit closer being arranged in a circuit derived from the motor armature supply line, and means in the motor field supply line for rendering said circuit closer operatively effective only upon a predetermined condition of the motor field supply line.

In testimony whereof I have hereunto affixed my signature.

WALTER S. PFEIFER.